United States Patent [19]

Gilbert

[11] 4,017,832

[45] Apr. 12, 1977

[54] TWO WIRE COMMAND AND MONITORING SYSTEM

[75] Inventor: Donald Edmond Gilbert, Houston, Tex.

[73] Assignee: Powell Electrical Manufacturing Company, Houston, Tex.

[22] Filed: May 27, 1976

[21] Appl. No.: 690,411

Related U.S. Application Data

[63] Continuation-in-part of Ser. No. 596,386, July 16, 1975, Pat. No. 3,993,977.

[52] U.S. Cl. .......................... 340/147 LP; 307/140; 318/266; 361/210

[51] Int. Cl.² ..................... H04Q 9/06; H01H 47/00

[58] Field of Search ......... 340/147 R, 147 LP, 176; 307/140; 317/136, 137; 318/264, 266, 626, 446

[56] References Cited

UNITED STATES PATENTS

| | | | |
|---|---|---|---|
| 2,992,366 | 7/1961 | Veltfort, Jr. | 317/137 |
| 3,185,911 | 5/1965 | Epstein et al. | 318/446 |
| 3,398,329 | 8/1968 | Cataldo et al. | 317/136 |
| 3,629,608 | 12/1971 | Trindle | 307/140 |

*Primary Examiner*—Donald J. Yusko

*Attorney, Agent, or Firm*—David M. Ostfeld; Murray Robinson; Ned L. Conley

[57] ABSTRACT

An improved system and method for transmitting and monitoring, for example, commands to relays or other output command devices driving controlled devices remotely located from the transmission portion of the transmission and monitoring system. The system is usually divided into two parts geographically separated by a significant distance with two wires running between the parts. The first part is used for transmitting the command and interrogation signals through the use of current levels set by overall circuit characteristics and produced on alternate positive and negative half cycles by an alternating current source and set by the resistive load in the loop. The second part is for interpreting the signal by relay discrimination to determine if it is a command or just the interrogation signal requesting the current state of the device being controlled by the system and also for local indication. During operation, when no commands are being sent to the receiving part, the signals indicate the present state of remote contacts that represent the positional state of the controlled device. When a command is to be sent to the receiving part, the current is changed by resistive load change to a new level which represents the command to be transmitted to the receiving part. The improvement prevents the stop command from actuating the system in an improved manner rather than stopping the controlled device.

3 Claims, 3 Drawing Figures

TWO WIRE COMMAND AND MONITORING SYSTEM

CROSS REFERENCE TO RELATED APPLICATIONS

This application is a continuation-in-part of my copending application Ser. No. 596,386, filed July 16, 1975, now U.S. Pat. No. 3,993,977, entitled "Two Wire Command and Monitoring System".

BACKGROUND OF THE INVENTION

1. Field of the Invention

The present invention relates to an improved data transmission and monitoring system and method for transmitting and monitoring commands to devices including commands to open or close a valve or stop the valve somewhere in the middle of its travel. The present invention has been found to be particularly useful in the discrete state command and monitoring transmission art in industrial environments, especially as a device for controlling and monitoring motors and valves, and, hence, will be discussed with particular reference thereto. However, the present invention is applicable to many other types of discrete commands as well, as long as each operation on the device is of a discrete nature as opposed to continuous nature.

2. Description of the Prior Art

In the transmission and detection of commands to valves and motors, transmission systems are usually divided into two portions, one located where the commands are to originate, either by an automatic system or by a manual request from a human operator, and the other where the command is detected and routed to activate the controlled device and indicate the present state of the controlled device locally, as well as transmit the state back to the transmission means. Additional components are used to transmit the signal from the transmission portion to the receiving portion, including a power source to activate both the transmission and the receiving portion simultaneously and wires for carrying the signal. The system must be capable of transmitting signals to the remote location in such a manner that environmental factors which usually exist in industrial plants will not affect the signals transmitted. The system must also be reliable in operation for a long period of time and consistent in its manner of operation. In addition, the system must correctly perform a stop function to prevent actuation of the device.

Several types of transmission and detection systems have been known and used before, and typical examples thereof in the valve and motor command monitoring art are shown in U.S. Pat. No. 3,256,517, issued June 14, 1966, to T. Saltzberg et al.; U.S. Pat. No. 3,289,166, issued Nov. 29, 1966, to D. G. Emmel; U.S. Pat. No. 2,360,172, issued Oct. 10, 1944, to C. E. Stewart; U.S. Pat. No. 2,788,517, issued Apr. 9, 1957, to W. L. Smoot et al.; U.S. Pat. No. 3,251,992, issued May 17, 1966, to R. B. Haner, Jr.; U.S. Pat. No. 3,315,231, issued Apr. 18, 1968, to P. Belugou; U.S. Pat. No. 3,254,335, issued May 31, 1966, to R. J. Staten; U.S. Pat. No. 3,202,978, issued Aug. 24, 1965, to G. E. Lewis; U.S. Pat. No. 2,525,016, issued Oct. 10, 1950, to G. L. Borell; U.S. Pat. No. 2,003,047, issued May 28, 1935, to S. C. Henton et al.; U.S. Pat. No. 2,019,350, issued Oct. 29, 1935, to R. Koberich; U.S. Pat. No. 2,260,061, issued Oct. 21, 1941, to C. E. Stewart; U.S. Pat. No. 2,992,366, issued July 11, 1961, to T. E. Veltfort, Jr.; U.S. Pat. No. 3,185,911, issued May 25, 1965, to H. Epstein et al.; U.S. Pat. No. 3,629,608, issued Dec. 21, 1971, to Joseph W. Trindle; and U.S. Pat. No. 3,398,329, issued Aug. 20, 1968, to J. B. Cataldo et al.

The Saltzberg, Emmel and Stewart data transmission and collection systems use conventional coding techniques such as pulse coding or tone transmission to transmit information from the transmission device to the receiving device. However, this type of prior art requires complex logic for encoding and decoding data at the transmission device and at the receiving devices.

The Smoot, Haner, Belugou, Staten, Lewis, Trindle, Epstein and Borell devices use either direct current signals to transmit the information or three wires to transmit the information from the transmission device to the receiving device, requiring relatively high sustained voltage values which would be unsafe in an industrial environment or additional stringing of wires over long distances.

The Henton, Koberich, Stewart and Veltfort devices all use a different polarity current in a two-wire mode to transmit information from the transmission device to the receiving device but none of them disclose a stop function.

Another alternating polarity current transmission system is disclosed in FIG. 1 which has been used publicly and is part of the prior art. This system, however, requires additional relay contacts, as will be discussed in the Detailed Description of the Preferred Embodiment, to prevent the stop function from actuating the controlled device to move rather than to stop the controlled device.

SUMMARY OF THE INVENTION

The present invention uses a very simple but highly effective means to electrically prevent signals from being transmitted to a controlled device when a stop request is made. This means interlocks the stop request function with the known state of the controlled device and prevents initiation of the stop request if the controlled device has already stopped in an extreme position reflected by the circuit feedback contacts from the controlled device without the use of additional relay contacts.

BRIEF DESCRIPTION OF THE DRAWINGS

For a further understanding of the nature and objects of the present invention, reference should be had to the following detailed description, taken in conjunction with the accompanying drawings in which like parts are given like reference numerals and wherein.

DETAILED DESCRIPTION OF THE PREFERRED EMBODIMENT

Introduction

The improved data transmission and monitoring system of the preferred embodiment may be used for control and monitoring of discrete actuation controlled devices connected to the system such as valves or motors wherein it is important that the devices controlled and monitored be remotely located from the transmission portion of the system with prevention of erroneous actuation of the controlled device by use of a stop function. A particularly important application of the present invention is in the control and monitor of valves in industrial plants using open and close commands, as well as a stop command for stopping the valve during its travel from the open to the closed state, and, therefore, the preferred embodiment will be described with respect to such an application. However, it should be realized that the present invention could be applied to, for example, any application where it is desired to transmit discrete information from one location to another using variable current levels in the form of commands, to controlled devices and monitor the results of those commands wherein the state of the controlled device and a command must be interlocked.

In the preferred embodiment of the present invention, the transmission is accomplished through the use of two circuit resistance set levels of current on each half cycle of an alternating current power supply for monitoring the state of the controlled device and for open/close valve commands. These commands are electrically isolated from the circuitry that actuates the device by relay isolation. The current level of the signals is determined by the circuit resistance, a characteristic of the relays, lines, and other resistance used in the circuit. This resistance is varied when a command to the controlled device is initiated by some circuit resistance being changed thereby raising current level on one of the half cycles of the alternating current power supply. The commands are decoded by current level using relay detection. A stop function is implemented to terminate activation of the valve before it has reached the extreme position of its travel. This stop function is accomplished through interlocks in the relay actuation circuitry of the controlled device. The transmission portion of the system actuates the stop function by imposing raised current levels on consecutive half cycles at the alternating current power supply. The improved circuit prevents the stop function initiation when the valve is in either extreme position of travel as indicated by discrete state feedback.

Structure and Operation

Figure 1:
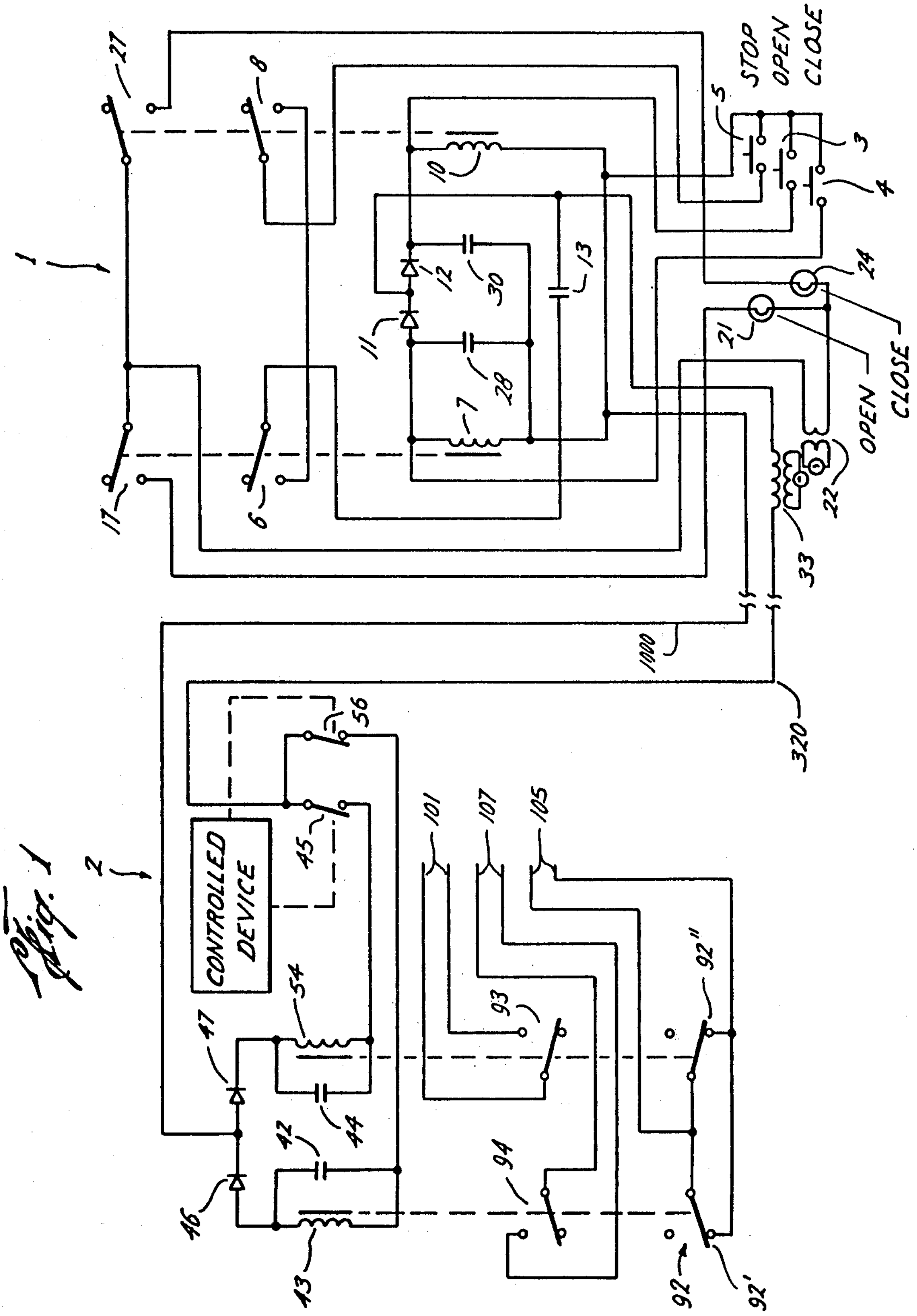
FIG. 1 is a diagram of the electric circuit of a system according to the prior art using relay interlocks to prevent accidental actuation of the controlled device upon activation of the stop function.
Figure 3:
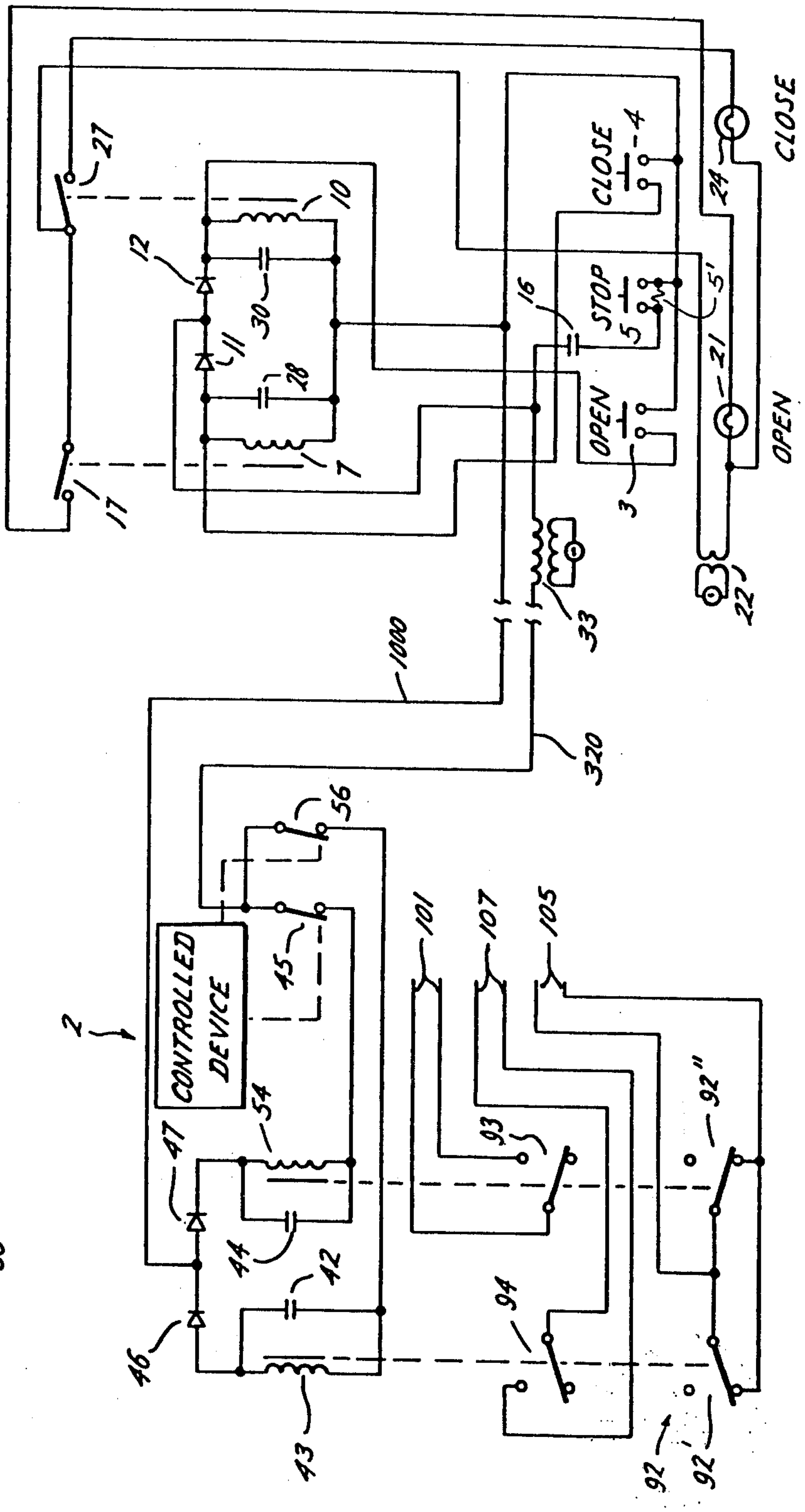
FIG. 3 is a diagram of the electric circuit of the preferred embodiment of the apparatus of the present invention showing the stop interlock.

Referring to FIGS. 1 and 3, there are shown data transmission and monitoring systems as two-part systems. The transmission and indication parts 1,1' of the systems respectively of FIGS. 1 and 3 are composed of current driving means comprising relays 7 and 10 wired in series with power supply 33. The current through each relay 7, 10 is determined by the circuit resistance for the appropriate polarity of power supply 33 when current is conducting through the relay, including the resistance of the relays 7, 10. Diodes 11 and 12 respectively in series with the relays 7, 10 protect them and prevent their conduction to actuation levels during the inappropriate circuit polarity of power supply 33. Wired in parallel with the relays 7 and 10 are push button actuated switches 3 and 4 respectively labelled OPEN and CLOSE. Relays 7 and 10 have associated contacts 17 and 27 respectively. Contacts 17 and 27 are wired in series with lights 21 and 24 respectively labelled OPEN and CLOSE. The contacts 17 and 27 and lights 21 and 24 are connected to power supply 22. It is also well known in the art to remotely control lights 21 and 24 by the use of the contacts, additional relays or other means if it is desired to remotely locate them. Each relay 7, 10 has associated with it a capacitor 28, 30 respectively to prevent surges and noise actuation of the system. These capacitors also keep the relays 7 and 10 energized for the alternate half cycle of power supply 33.

In FIG. 1, the transmission and indication part 1 also has relay contacts 6, 8 associated with relays 7, 10 respectively. Contacts 6, 8 are connected in series to each other and in series with capacitor 13 and push button actuated switch 5 labelled STOP, all being in parallel with both relays 7 and 10.

In FIG. 3, the transmission and indication part 1' has capacitor 16 connected in series with push button actuated switch 5 labelled STOP, both being in series with power supply 33 and transmission line 1000.

The transmission and indication portions 1,1' of the systems of FIGS. 1 and 3 respectively are connected to conductors 320 and 1000. Also connected to the conductor 320 is power supply 33. Conductors 320 and 1000 are connected between monitoring and control part 2 of the systems and transmission and indication portions 1,1' of the systems.

The monitoring and control part 2 of the systems comprises current level actuation means, relays 43 and 54. Capacitors 42 and 44 are wired in parallel to relays 43 and 54 respectively to prevent surges and noise actuation of the systems. These capacitors also keep the relays 42 and 44 energized for the alternate half cycles of power supply 33 above the appropriate current level. Diodes 46, 47 respectively in series with relays 43 and 54 protect and prevent the relays 43 and 54 from passing current during the inappropriate circuit polarity of power supply 33. When the level of current passing through the relay 43 or 54 reaches a value sufficient to energize the relays, relay 43 or 54 will close its contacts 93 or 94 respectively which will energize coil 950 or coil 960 (FIG. 2).

Figure 2:
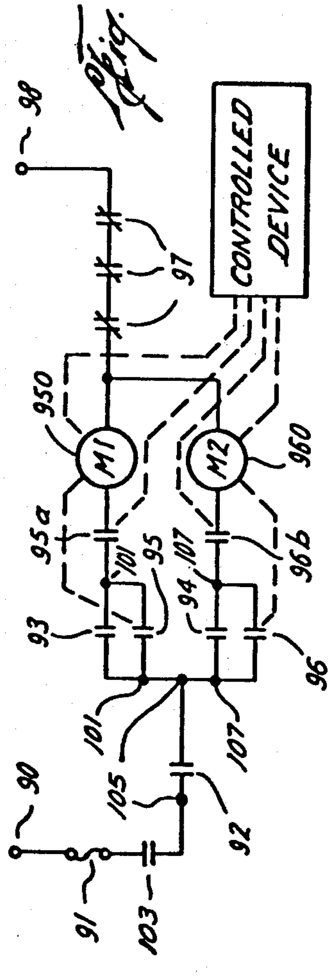
FIG. 2 is a diagram of the relay circuitry of the controlled device of the preferred embodiment of the apparatus of the present invention used with the circuitry of FIGS. 1 or 3.

As best shown in FIG. 2, contacts 93 connected at 101 and 94 connected at 107 of relays 43 and 54 respectively and contacts **96*b* and 95*a* of the controlled device indicating, the extreme states of the controlled device, are connected in series with each other respectively and in series with fuse 91, effective relay contact 92, relay contacts 97 of overload sensors, time delay relay contact 103, and relay coils 950 and 960, all between the high side 90 of a power supply and the neutral 98. Relay coils 950 and 960 have contacts 95 and 96 respectively wired in parallel with contacts 93 and 94 respectively to lock in contacts 93 and 94 for continued activation of the controlled device after the relay 43 or 54 no longer has sufficient current to stay actuated. Effective relay contact 92 is made up in part of contacts 92' and 92" respectively of relay 43 and 54 wired in parallel. It also has a time delay relay contact 103 in series with contacts 92' and 92"**.

Relay coils 950 and 960 are connected to the controlled device by contacts not shown and the state of the controlled device is given by contacts 45 and 56

(FIGS. 1 and 3) wired in series with relays 54 and 43 respectively.

In the preferred embodiment for illustration purposes, it should be recognized that contacts 45 and/or 56 are closed when the controlled device is not in the state represented by the contact. Therefore, both contacts 45 and 56 will be closed while the controlled device is in transit. The controlled device will open either contact 45 or 56 upon reaching the end position represented by contact 45 or 56 respectively. If the controlled device (valve) is in the "open" position, it will force contact 45 open. If the controlled device (valve) is in the "closed" position, it will force contact 56 open. The opening of these contacts may be by either mechanical, electrical, or electronic linkage.

As shown in FIG. 1 or FIG. 3, neither "open" pushbutton actuated switch 3 nor "close" pushbutton actuated switch 4 is in an actuated, depressed state.

Under these conditions, if the system were in a quiescent state with the controlled device either in one or the other of its terminal positions, closed or opened, either "open" contact 45 or "close" contact 56 would be closed and the other would be open.

For purposes of illustration only, presume that "close" relay contact 56 were closed and "open" relay contact 45 were open, indicating that the controlled device is in the open position. During every positive half-cycle of the power supply 33, this would cause current to flow through relay 7. Obviously, diode 12 would prevent any actuation of relay 10 during the positive half-cycle of the power supply 33, as does diode 11 prevent any actuation of relay 7 during the negative half-cycle of the power supply 33.

During the positive half-cycle of power supply 33, the current has only one path to go from relay 7. It will flow through conductors 320, 1000 to the "close" contact 56 which is closed because the controlled device is not in the closed state.

Relays 7 and 10 are selected to have a resistive characteristic so that insufficient current is generated to actuate relays 43 and 54 respectively but to permit actuation of relays 7 and 10. Therefore, all current generated through conductor 320 will flow through contact 56, through relay 43 without actuating the relay, through diode 46, through relay 7, and through diode 11, returning to power supply 33. Therefore, current not being sufficient to actuate relay 43, the system will stay in a quiescent state with light 21 lit through closure of contact 17 by relay 7. Capacitor 28 will keep the relay 7 actuated during the negative half-cycle of power supply 33. This will indicate, without control action being taken, that the present state of the controlled device is, for example, open. The source of power for light 21 is voltage supply 22 conducting through contact 17 to light 21.

During the negative half-cycle of the power supply 33, no conduction will take place. Contact 45 is open, as a result of the controlled device indicating that it is already in the open state through contact 45 opening, and, therefore, there is no path for current to flow.

When the "close" pushbutton is depressed actuating closed pushbutton actuated switch 4, a different level of current will be allowed to flow through relay 43 from the power supply 33 on each positive half-cycle because relay 7 and capacitor 28 are shorted by the closure of pushbutton actuated switch 4. This current will exceed the current level necessary to actuate relay 43.

With relay 43 actuated, relay contact 94 will be closed and relay contact 92' will be opened. Relay contact 92'' will still be closed so that the effective relay contact 92 of FIG. 2 will remain in a closed state. As best seen in FIG. 2, the closure of contact 94 will cause the actuation of control device coil 960 of relay M-2, by the current path from the voltage source 90, to fuse 91, through time delay relay contact 103 and closed contact 92 and closed contact 94 to coil 960 of relay M-2, through overload closed contact(s) 97 to neutral 98. Capacitor 42 will keep relay 43 actuated during the negative half-cycle of power supply 33. This will cause the control device to go to its other state.

While the control device such as, for example, a valve is in transit, both contacts 45 and 56 would be closed by techniques well known in the art, and current is permitted to flow during both half-cycles of power supply 33. The levels of current on each half-cycle of power supply 33 will not be the same so long as pushbutton actuated switch 4 is depressed and pushbutton actuated switch 3 is not depressed.

Of course, the current path during the negative half-cycle of power supply 33 through conductors 320 would be identical in method of actuation to the path during the positive half-cycle when pushbutton 4 is not depressed. Therefore, current during the negative cycle would flow through diode 12, through relay 10, through conductors 320 and 1000, through diode 47, through relay 54, through contact 45, and to power supply 33. Relay 10 would also close contact 27 which would cause light 24 to go on.

After pushbutton actuated switch 4 is released, light 21 would also go on again. It, of course, would have been off while relay 7 was shorted because contact 17 would have been open. Therefore, while the control device is in transit, and after the pushbutton 4 has been released, transmission portion 1 or 1' would indicate to the operator that both contacts 45 and 56 were closed by lights 21 and 24 being lit.

When the controlled device (valve) has completed its travel to the opposite or closed state, then contact 56 would be opened by methods well known in the art thereby preventing any current flow during the positive half-cycle of the power supply 33. Contact 95a would also be opened by the controlled device by methods well known in the art thereby stopping the current to motor relay coil M-1, 950. The only current path remaining would be that corresponding to relay 10 conducting to relay 54. Therefore, light 24 at the transmission portion 1 or 1' would stay lit while light 21 would be extinguished. Relay 54 would not be actuated until the "open" pushbutton actuated switch 3 is depressed because of the resistance characteristics of relay 10 keeping the current level below the actuation level of relay 54.

Therefore, there are four discrete current levels available in the system of either the prior art or the present invention, two during the positive half-cycle of power supply 33 and two during the negative half-cycle of power supply 33. These currents are all set by the resistance characteristics of the relays, lines, and other circuit resistances. One level of current in either the positive half-cycle for relay 7 or negative half-cycle for relay 10 of power supply 33 is produced when no pushbutton is depressed. The other level of current in either the positive or negative half-cycle, respectively, would occur as a result of shorting relay 7 or 10. These latter currents are imposed as a result of closures of either the "open" or "close" pushbuttons, while corresponding field contact 56 or 45 is closed.

It should be noted that, with proper relay configuration, the depression simultaneously of the "open" and "close" pushbuttons 3 and 4 during the transit of the controlled device (valve) between its open and its close position could stop the controlled device (valve) by interrupting the current to drive relay coils M-1 and M-2. This is accomplished in the circuits of FIGS. 1 or 3 by the use of pushbutton actuated switch 5 labelled STOP which has the effect of the simultaneous depression of pushbutton actuated switches 3 and 4. When pushbutton actuated switch 5 is depressed, both relays 7 and 10 are shunted on alternate half-cycles by capacitor 13 and actuation current levels are impressed on lines 320 and 1000 on alternate half-cycles. Therefore, both contacts 92' and 92'' will be opened simultaneously as contacts 93 and 94 are thereby closed which effectively opens contact 92, being in part the representation of contacts 92' and 92'' wired in parallel. This will cause a momentary break in the circuit which will cause interruption of the current to relay coils 950 and 960 of relays M-1 and M-2 causing contacts 95 and 96 to drop out and no longer latch-in the actuation of coils 950 and 960 of relays M-1 and M-2. This would stop the controlled device (valve) somewhere intermediate in travel of the controlled device (valve) to either end state. By again depressing either the "open" pushbutton actuated switch 3 or "close" pushbutton actuated switch 4, travel of the controlled device (valve) can again be started because contacts 45 and 56 are both still closed. Therefore, upon actuation of either pushbutton actuated switch 3 or pushbutton actuated switch 4, either relay 43 or relay 54 will again energize, i.e. so long as only one pushbutton, either "open" or "close" is depressed, then the opposite contact, either contact 92'' or contact 92', respectively, will be closed permitting current to flow from power source 90 to neutral 98 through effective contact 92.

With the circuit as shown in FIG. 1 or 3, the depression of pushbutton actuated switch 5 would, however, still not be sufficient to prevent the occasional restarting of the controlled device (valve) as a result of a race after stopping action. As just discussed, the controlled device (valve) can be stopped in midtravel by the opening of both normally closed contacts 92' and 92''. When pushbutton 5 is released however, relay 43 may de-energize before 54 does or vice versa, thus creating a condition in FIG. 2 where contact 92'' is closed and contact 94, the normally open contact of relay 43, is still closed thus energizing relay 960. Relay 960 then seals in through its contact 96 thus remaining energized until contact **96*b* opens at the end of travel. It is well known, however, in the art to use a time delay relay or other means to activate time delay relay contact 103 in series with effective relay 92 to prevent this relay "race" by holding the contact 103** open until all other contacts have settled.

There is a disadvantage to using pushbutton actuated switch 5 with the prior art circuit shown in FIG. 1. Without additional relay contacts 6, 8 of FIG. 1, the depression of pushbutton actuated switch 5 when the controlled device (valve) is in either the fully open or fully closed position, as reflected by contact 45 or contact 56 being closed, would cause the controlled device (valve) to start moving to the other position. If contact 45 is open, only relay 43 will energize, even if pushbutton actuated switch 5 is depressed, because there is no conduction during the negative half-cycle of power supply 33. The depression of the "stop" pushbutton therefore would be equivalent to the "close" pushbutton being depressed which is opposite the desired function of the "stop" pushbutton.

As shown in FIG. 1, additional contacts 6, 8 are used in the prior art to eliminate unwanted actuation when the "stop" pushbutton is depressed with the controlled device (valve) being in either extreme of its travel. As shown in FIG. 1, the "stop" pushbutton 5 would not be effective unless the valve or other control device were in transit. When the control device is in transit, both relays 7 and 10 would be energized on alternate half-cycles of power supply 33 and kept actuated on the other half-cycle by capacitors 28, 30 respectively because both contact 45 and contact 56 are closed. The interlocking of pushbutton actuated switch 5 with conduction in alternate half-cycles of power supply 33 is accomplished by placing relay contacts 6 and 8 of relays 7 and 10 in series with power supply 33 to pushbutton 5. Capacitor 13 in combination with capacitors 28, 30 is used to prevent contacts 6, 8 from "chattering" i.e. prevents bouncing of the contacts on actuation. This prior art method of interlocking, however, requires the use of the additional relay contacts 6, 8 for each relay 7, 10 respectively which is expensive.

The apparatus of the preferred embodiment of the present invention of FIG. 3 uses capacitor 16 which is properly sized to quickly charge, prior to the reaction time at relays 43, 54, to the peak value of power supply 33 for successive half-cycles of the same polarity from power supply 33 for either the positive or negative half-cycle of power supply 33 if such half-cycle is not followed by the next sequential half-cycle of opposite polarity. Additionally, resistor 5', such as 10,000 ohms, is connected in parallel with switch 5. In this manner, when the controlled device is not in transit, then resistor 5' will permit capacitor 16 to bleed charge to the voltage level of power supply 33 over the number of cycles determined by the product of the capacitance of capacitor 16 and resistance of resistor 5'. The value of the resistor is set high to keep the bleed charge current well below any actuation levels for relays 43, 54. Of course, if the controlled device is in transit, the conduction through capacitor 16 and resistor 5' on both half cycles will prevent such a build-up. Therefore, the slow charge of capacitor 16 when the controlled device is not in transit prevents the necessity of charging up the capacitor upon depression of pushbutton 5. Therefore, there is no beginning current because of the charging pulse to capacitor 16 upon depression of pushbutton 5, eliminating any possiblity of triggering relays 43, 54 if they should be sensitive. In this manner, the need for additional contacts for relays 7, 10 is eliminated because capacitor 16 will charge and therefore effectively open the part of the circuit where pushbutton actuated switch 5 is located, before pushbutton actuated switch 5 is closed when the valve or other controlled device is not in transit, by presenting an equal and opposite voltage to the voltage level of power supply 33.

Although the system as described in detail supra has been found to be most satisfactory and preferred, different applications and many variations in its elements and the structure of its elements are possible. For example, the system of the present invention can be used to faciliate motor start and stopping. Moreover, the system of the present invention can be equipped with fault detection means that would respond to no current flowing in successive half-cycles of power supply 33 to indicate equipment failure. Additionally, triac or other output devices may be substituted for output relays. Also, additional means may be employed to transmit the actual position of the valve or other control device to the transmission portion of the syste to permit precise control of the position of the valve through remote actuation means. Moreover, two control devices may be controlled and monitored if they have only a single state through one system. Also, instead of lights in the transmission and indication portion of the system, relays could be used in the transmission and indication portion of the system that would actuate lights and other devices. Also the relays could be actuated by means remote from the transmission and indication means rather than pushbuttons.

The above are merely exemplary of the possible changes or variations.

Because many varying and different embodiments may be made within the scope of the inventive concept herein taught, and because many modifications may be made in the embodiment herein detailed in accordance with the descriptive requirements of the law, it is to be understood that the details herein are to be interpreted as illustrative and not in a limiting sense.

What is claimed as invention is:

1. A transmitting and monitoring system for transmitting commands over a pair of wires to a controlled device having two end states and for monitoring the states of the controlled device, comprising:

transmission and indication means for monitoring such states of such controlled device and including command means for transmitting three commands over such pair of wires including a command to stop such controlled device, said command means including actuation means for actuating said command means to transmit said commands;

control implementation means for receiving such commands from such pair of wires and transmitting such commands to such controlled device; and said transmission means including inhibiting means for preventing such stop command from being transmitted when such controlled device is in one of such two end states, said inhibiting means including a first portion connected in series with said actuation means for said stop command and a second portion connected in parallel with said actuation means.

2. The system of claim 1 wherein said first portion includes a capacitor.

3. The system of claim 2 wherein said second portion includes a resistor.

* * * * *

UNITED STATES PATENT AND TRADEMARK OFFICE
CERTIFICATE OF CORRECTION

PATENT NO. : 4,017,832

DATED : APRIL 12, 1977

INVENTOR(S) : DONALD EDMOND GILBERT

It is certified that error appears in the above-identified patent and that said Letters Patent are hereby corrected as shown below:

Column 6, line 26: after "negative", delete "cycle" and insert -- half-cycle --.

Column 7, line 60: after "art", delete "circut" and insert -- circuit --.

Column 9, line 6: after the second instance of "the", delete "syste" and insert -- system --.

Signed and Sealed this

***Twenty-seventh* Day of *June 1978***

[SEAL]

*Attest:*

RUTH C. MASON
*Attesting Officer*

DONALD W. BANNER
*Commissioner of Patents and Trademarks*